(12) United States Patent
Yoshida et al.

(10) Patent No.: US 7,501,083 B2
(45) Date of Patent: Mar. 10, 2009

(54) INJECTION MOLDING MACHINE AND INJECTION MOLDING METHOD

(75) Inventors: Hideki Yoshida, Chiba (JP); Kuniaki Hino, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 97 days.

(21) Appl. No.: 10/572,759

(22) PCT Filed: Oct. 1, 2004

(86) PCT No.: PCT/JP2004/014495

§ 371 (c)(1),
(2), (4) Date: Mar. 21, 2006

(87) PCT Pub. No.: WO2005/032796

PCT Pub. Date: Apr. 14, 2005

(65) Prior Publication Data

US 2007/0057392 A1    Mar. 15, 2007

(30) Foreign Application Priority Data

Oct. 6, 2003    (JP) ............................. 2003-346720

(51) Int. Cl.
*B29C 45/76* (2006.01)
*B29C 45/64* (2006.01)

(52) U.S. Cl. .................. 264/40.1; 264/328.7; 425/145; 425/150

(58) Field of Classification Search ................ 264/40.1, 264/328.1, 328.7, 2.2, 40.5, 40.7; 425/150, 425/145, 149
See application file for complete search history.

(56) References Cited

U.S. PATENT DOCUMENTS 5,500,166 A * 3/1996 Sasaki et al. ............... 264/40.4

(Continued)

FOREIGN PATENT DOCUMENTS

DE      198 47 740 C1    3/2000

(Continued)

*Primary Examiner*—Jill L Heitbrink
(74) *Attorney, Agent, or Firm*—Squire, Sanders & Dempsey L.L.P.

(57) ABSTRACT

An object is to provide an injection molding machine and an injection molding method which can shorten the molding cycle without deteriorating accuracy in transfer of a pattern of an information surface of a stamper and without deteriorating optical characteristics. The injection molding machine includes mold closing processing means for performing mold closing; movable-platen-position determination means for determining whether or not a movable platen (23) has reached an injection start position (Sb) set between a mold opening limit position and a mold closing limit position; and injection processing means for starting an injection step when the movable platen (23) reaches the injection start position (Sb). In this case, since the injection step is started before the movable platen reaches the mold closing limit position, the molding cycle can be shortened by an amount corresponding to a time by which the start of the injection step is advanced.

5 Claims, 6 Drawing Sheets

U.S. PATENT DOCUMENTS

| | | | | |
|---|---|---|---|---|
| 5,547,619 | A * | 8/1996 | Obayashi | 264/40.1 |
| 5,772,932 | A * | 6/1998 | Kamiguchi et al. | 264/40.5 |
| 5,945,047 | A * | 8/1999 | Yukihiro et al. | 264/40.5 |
| 6,331,263 | B1 * | 12/2001 | Abe et al. | 264/40.5 |
| 6,716,374 | B2 * | 4/2004 | Yutani et al. | 264/1.33 |
| 6,998,076 | B2 * | 2/2006 | Ohshiro | 264/40.5 |
| 2003/0047827 | A1 * | 3/2003 | Weinmann | 264/40.5 |

FOREIGN PATENT DOCUMENTS

| | | |
|---|---|---|
| DE | 101 46 800 A1 | 9/2002 |
| DE | 101 15 253 A1 | 10/2002 |
| DE | 102 19 315 A1 | 11/2002 |
| DE | 100 85 403 T5 | 4/2004 |
| JP | 63-135221 | 6/1988 |
| JP | 3-118130 | 5/1991 |
| JP | 6-226806 | 8/1994 |
| JP | 8-276479 | 10/1996 |

* cited by examiner

INJECTION MOLDING MACHINE AND INJECTION MOLDING METHOD

TECHNICAL FIELD

The present invention relates to an injection molding machine and an injection molding method.

BACKGROUND ART

Conventionally, an injection molding machine includes an injection apparatus. The injection apparatus includes a heating cylinder having an injection nozzle at its front end; a screw disposed within the heating cylinder such that the screw can rotate and can advance and retreat; and a drive unit for rotating, advancing, and retreating the screw.

In a metering step, the screw is rotated whereby resin having fallen from a hopper and entered the heating cylinder is heated and melted, and is accumulated forward of a screw head. With this, the screw is retreated. Subsequently, in an injection step, the screw is advanced so as to inject the resin accumulated forward of the screw head from the injection nozzle and charge it into the cavity of a mold apparatus. In a cooling step, the resin in the cavity is cooled and solidified, whereby a disc substrate is produced as a molded product. At that time, a pattern of an information surface of a stamper disposed in the mold apparatus is transferred to the disc substrate. The mold apparatus is composed of a stationary mold and a movable mold. The movable mold is brought into contact with the stationary mold and is separated therefrom by means of a mold clamping apparatus, whereby mold closing, mold clamping, and mold opening operations of the mold apparatus are performed (see, for example, Patent Document 1).

Figure 1:
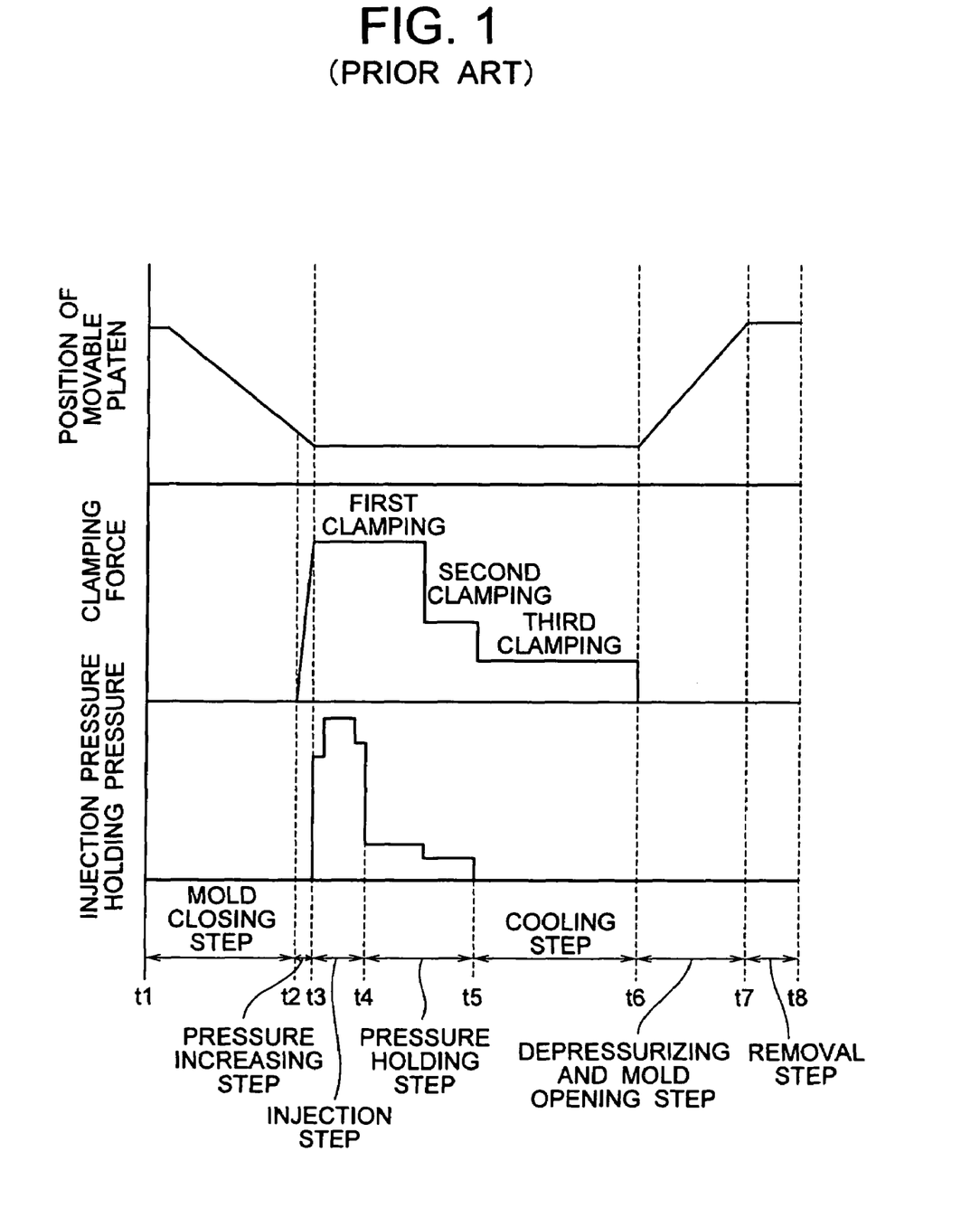
FIG. 1 is a time chart showing operation of a conventional injection molding machine.

FIG. 1 is a time chart showing operation of a conventional injection molding machine.

When a mold closing step is started at timing t1 in the mold clamping apparatus, the movable platen is advanced. When the mold closing step is completed at timing t2 upon engagement of the movable mold with the stationary mold, a pressure increasing step is started so as to increase the mold clamping force. With this operation, tie bars of the mold clamping apparatus extend, and the movable platen is advanced further by an amount corresponding to the extension.

When the movable platen is stopped at timing t3, the pressure increasing step is completed, and a mold clamping step is started, whereby a first mold clamping is performed. Simultaneously, an injection step is started in the injection apparatus, whereby resin is injected under a predetermined injection pressure.

Subsequently, at timing t4, the injection step is completed and a pressure holding step is started in the injection apparatus, whereby the pressure of the resin within the cavity is held at a predetermined holding pressure. Subsequently, in the mold clamping apparatus, the first mold clamping is ended, and second mold clamping is performed.

Then, at timing t5, the pressure holding step is completed and a cooling step is started in the injection apparatus; and in the mold clamping apparatus, third mold clamping is performed. At timing t6, the cooling step is completed in the injection apparatus, and the mold clamping step is completed in the mold clamping apparatus.

After these operations, a depressurizing and mold opening step is started in the mold clamping apparatus whereby the movable platen is retreated. When the depressurizing and mold opening step is completed at timing t7 and the movable platen is stopped, a removal step is started whereby a disc substrate is removed. At timing t8, the removal step is completed, whereby the injection molding ends.

Patent Document 1: Japanese Patent Application Laid-Open (kokai) No. 2002-86507

DISCLOSURE OF THE INVENTION

Problems to be Solved by the Invention

However, in the conventional injection molding machine, when an attempt is made to shorten the molding cycle performed through timings t1 to t8, the temperatures of the mold apparatus, the heating cylinder, etc. must be lowered so as to lower the molding temperature. However, when the molding temperature is lowered, accuracy in transfer of the pattern of the information surface of the stamper deteriorates. In addition, distortion, residual stress, and the like are generated in the molded disc substrate, so that deterioration of optical characteristics, such as birefringence, occurs.

An object of the present invention is to solve the above-mentioned problems in the conventional injection molding machine and to provide an injection molding machine and an injection molding method which can shorten the molding cycle without deteriorating accuracy in transfer of a pattern of an information surface of a stamper and without deteriorating optical characteristics.

Means or Solving the Problems

To achieve the above object, an injection molding machine according to the present invention comprises mold closing processing means for advancing a movable platen so as to perform mold closing; movable-platen-position determination means for determining whether or not the movable platen has reached an injection start position set between a mold opening limit position and a mold closing limit position; and injection processing means for starting an injection step when the movable platen reaches the injection start position.

Effects of the Invention

The injection molding machine according to the present invention comprises mold closing processing means for advancing a movable platen so as to perform mold closing; movable-platen-position determination means for determining whether or not the movable platen has reached an injection start position set between a mold opening limit position and a mold closing limit position; and injection processing means for starting an injection step when the movable platen reaches the injection start position.

In this case, since an injection step is started before the movable platen reaches the mold closing limit position, the molding cycle can be shortened by an amount corresponding to a time by which the start of the injection step is advanced.

The temperatures of a mold apparatus, a heating cylinder, etc. are not required to be lowered, and the molding temperature can be increased sufficiently. Therefore, it becomes possible to prevent deterioration of accuracy in transfer of a pattern of an information surface of a stamper. As a result, distortion, residual stress, and the like are not generated in molded products, whereby the mechanical characteristics of the molded products are improved. In addition, since occurrence of birefringence or the like can be suppressed, the optical characteristics of the molded products can be improved.

DESCRIPTION OF REFERENCE NUMERALS

23: movable platen
46: control section
Sa: retreat limit position
Sb: injection start position
Sd: advancement limit position

BEST MODE FOR CARRYING OUT THE INVENTION

Embodiments of the present invention will next be described in detail with reference to the drawings.

Figure 2:
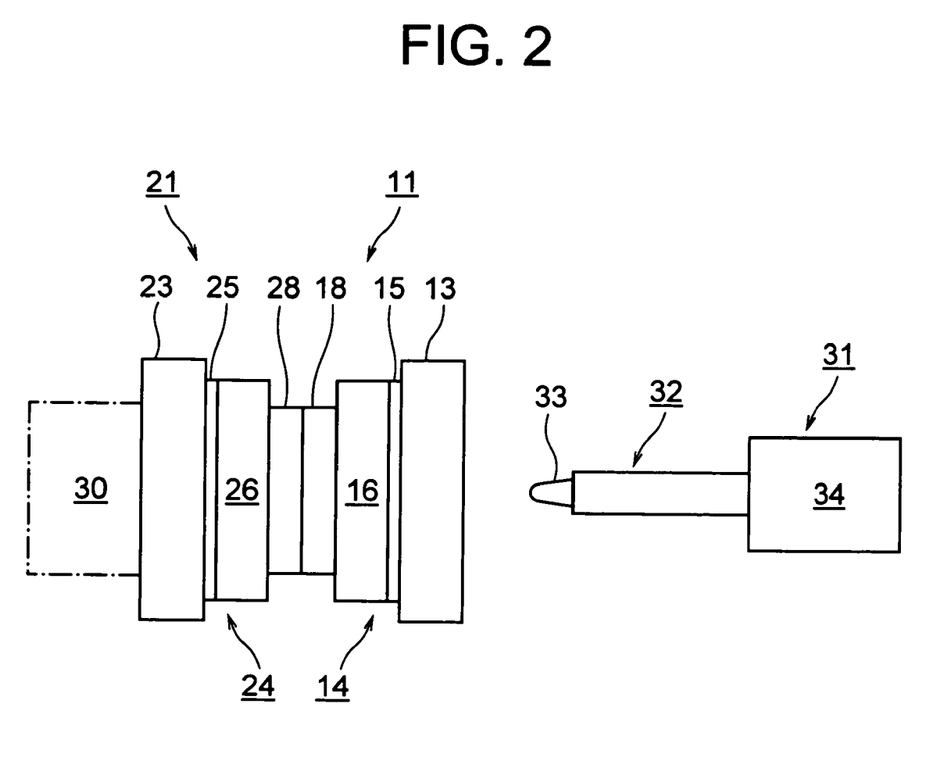
FIG. 2 is a schematic view of an injection molding machine according to a first embodiment of the present invention.
Figure 3:
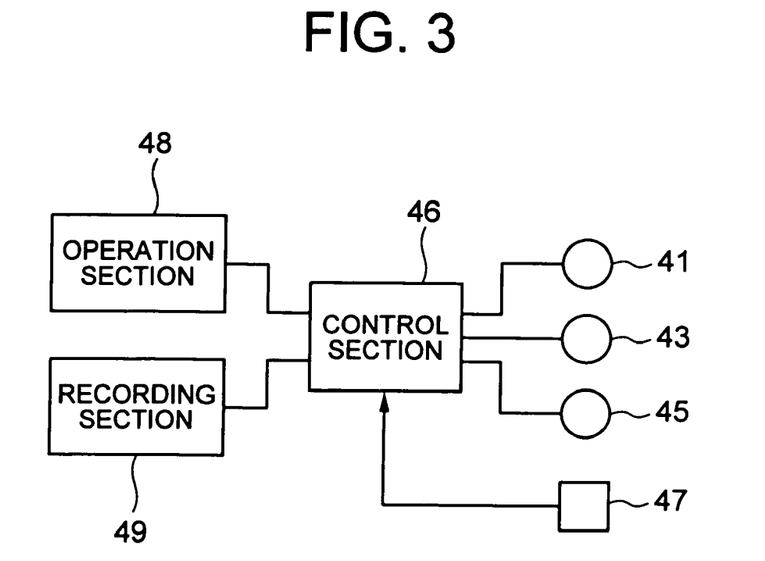
FIG. 3 is a block diagram of a control circuit according to the first embodiment of the present invention.

FIG. 2 is a schematic view of an injection molding machine according to a first embodiment of the present invention. FIG. 3 is a block diagram of a control circuit according to the first embodiment of the present invention.

In these drawings, reference numeral 11 denotes a stationary-side mold unit; 13 denotes a stationary platen (first support member); and 14 denotes a stationary mold (first mold). The stationary mold 14 includes a mold attachment plate 15, a disc plate 16 fixed to the mold attachment plate 15, and a mirror surface plate 18 attached to the disc plate 16. Notably, an unillustrated stamper is attached to the mirror surface plate 18, and an information surface including a plurality of fine projections and pits is formed on the stamper.

Reference numeral 21 denotes a movable-side mold unit; 23 denotes a movable platen (second support member) disposed such that it can advance and retreat (move in the left-right direction in FIG. 2) with respect to the stationary platen 13; and 24 denotes a movable mold (second mold) which faces the stationary mold 14 and is brought into contact with the stationary mold 14 or separated therefrom as result of advancement or retreat of the movable platen 23. The movable mold 24 includes a mold attachment plate 25, a disc plate 26 fixed to the mold attachment plate 25, and a mirror surface plate 28 attached to the disc plate 26 and forming an unillustrated cavity in cooperation with the mirror surface plate 18. The stationary mold 14 and the movable mold 24 constitute a mold apparatus.

An injection apparatus 31 is disposed on the rear side (right side in FIG. 2) of the stationary platen 13. The injection apparatus 31 includes a heating cylinder 32; an injection nozzle 33 attached to the front end (left end in FIG. 2) of the heating cylinder 32; an unillustrated screw disposed within the heating cylinder 32 such that the screw can rotate and can advance and retreat; and a drive unit 34. The drive unit 34 includes a metering motor (drive section for metering) 41 for rotating the screw, an injection motor (drive section for injection) 43 for advancing and retreating the screw, etc.

In a metering step, unillustrated metering processing means of a control section 46 performs metering processing so as to rotate the screw through drive of the metering motor 41, whereby resin having fallen from an unillustrated hopper and entered the heating cylinder 32 is heated and melted, and is accumulated forward of a screw head disposed at the front end of the screw. With this, the screw is retreated. Subsequently, in an injection step, unillustrated injection processing means of the control section 46 performs injection processing so as to advance the screw through drive of the injection motor 43 to thereby inject the resin accumulated forward of the screw head from the injection nozzle 33 and charge it into the cavity. In a cooling step, the resin in the cavity is cooled and solidified, whereby a disc substrate is produced as a molded product. At that time, a pattern of the information surface of the stamper is transferred to the disc substrate, whereby a plurality of fine pits are formed on the disc substrate.

A mold clamping apparatus 30 is disposed on the rear side (left side in FIG. 2) of the movable platen 23. The mold clamping apparatus 30 includes an unillustrated toggle support (third support member), an unillustrated toggle mechanism disposed between the toggle support and the movable platen 23, and a mold clamping motor (drive section for mold clamping) 45 for operating the toggle mechanism. The stationary platen 13, the movable platen 23, the toggle mechanism, the mold clamping motor 45, etc. constitute the mold clamping apparatus 30.

In a mold closing step, unillustrated mold closing processing means of the control section 46 performs mold closing processing so as to operate the toggle mechanism through drive of the mold clamping motor 45, to thereby advance the movable platen 23 for mold closing operation. In a mold clamping step, unillustrated mold clamping processing means of the control section 46 performs mold clamping processing so as to further operate the toggle mechanism to thereby press the mirror surface plate 28 against the mirror surface plate 18 for mold clamping operation. As a result of the mold clamping operation, a disc-shaped cavity is formed between the mirror surface plate 18 and the mirror surface plate 28 by means of concave portions thereof. Subsequently, in a depressurizing and mold opening step, unillustrated mold opening processing means of the control section 46 performs mold opening processing so as to operate the toggle mechanism to thereby stop the pressing of the mirror surface plate 28 against the mirror surface plate 18 and release the pressure from the cavity. Subsequently, the mold opening processing mean retreats the movable platen 23 for mold opening operation.

Incidentally, an encoder (position detection section) 47 is disposed on the mold clamping motor 45 so as to detect the position of the movable platen 23. A detection signal from the encoder 47 is fed to the control section 46. Therefore, the control section 46 can recognize the position of the movable platen 23 on the basis of rotational speed of the mold clamping motor 45. In place of the encoder 47, a linear sensor disposed between the movable platen 23 and an unillustrated frame of the injection molding machine can be used as a position detection section.

An operation section 48 for performing various input operations and a recording section 49 are connected to the control section 46. The control section 46, functioning as a computer, includes an unillustrated processor such as a CPU or MPU, and memory devices such as RAM and ROM.

An injection molding method performed by the injection molding machine having the above-described structure will now be described.

Figure 4:
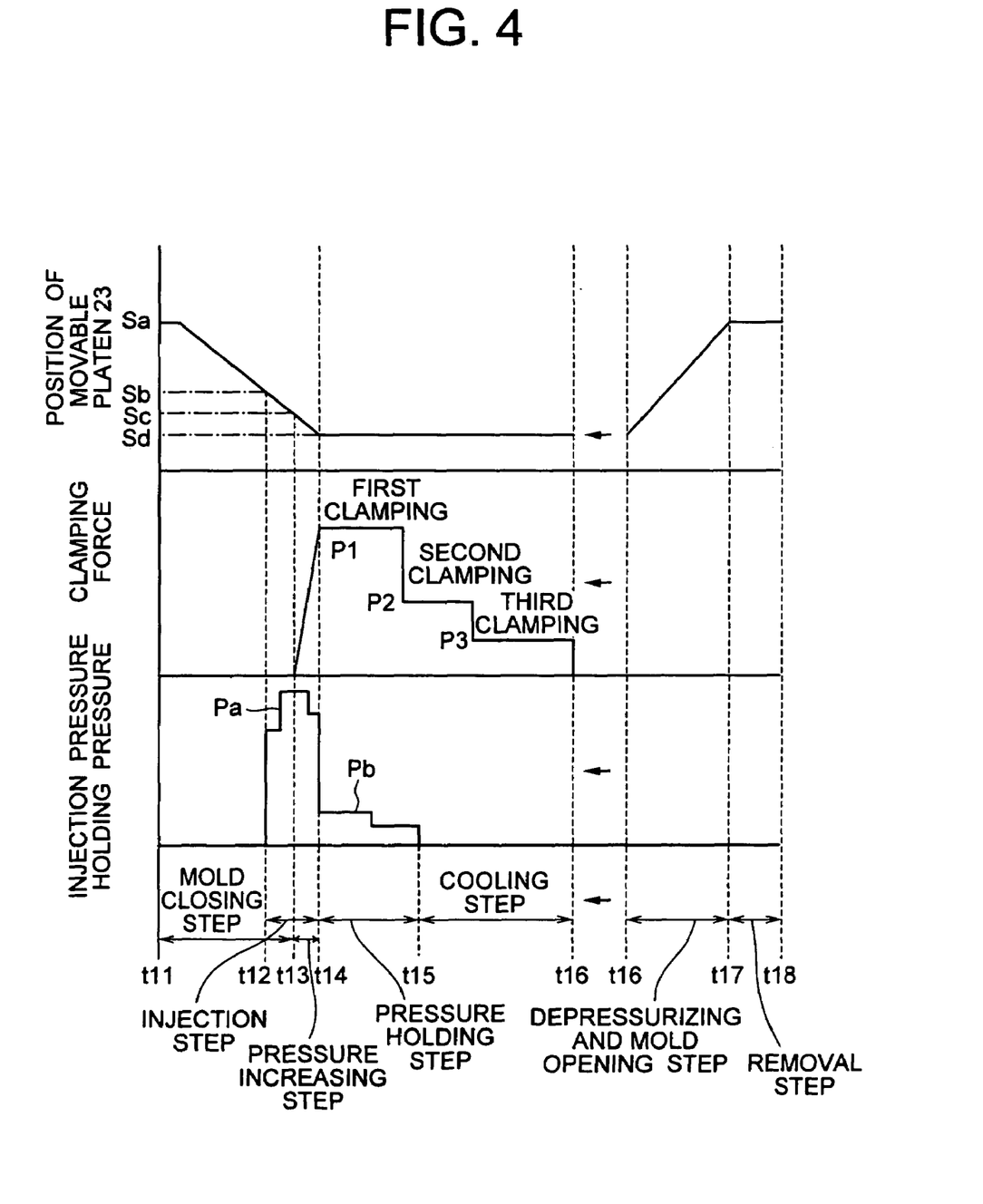
FIG. 4 is a time chart showing operation of the injection molding machine according to the first embodiment of the present invention.
Figure 5:
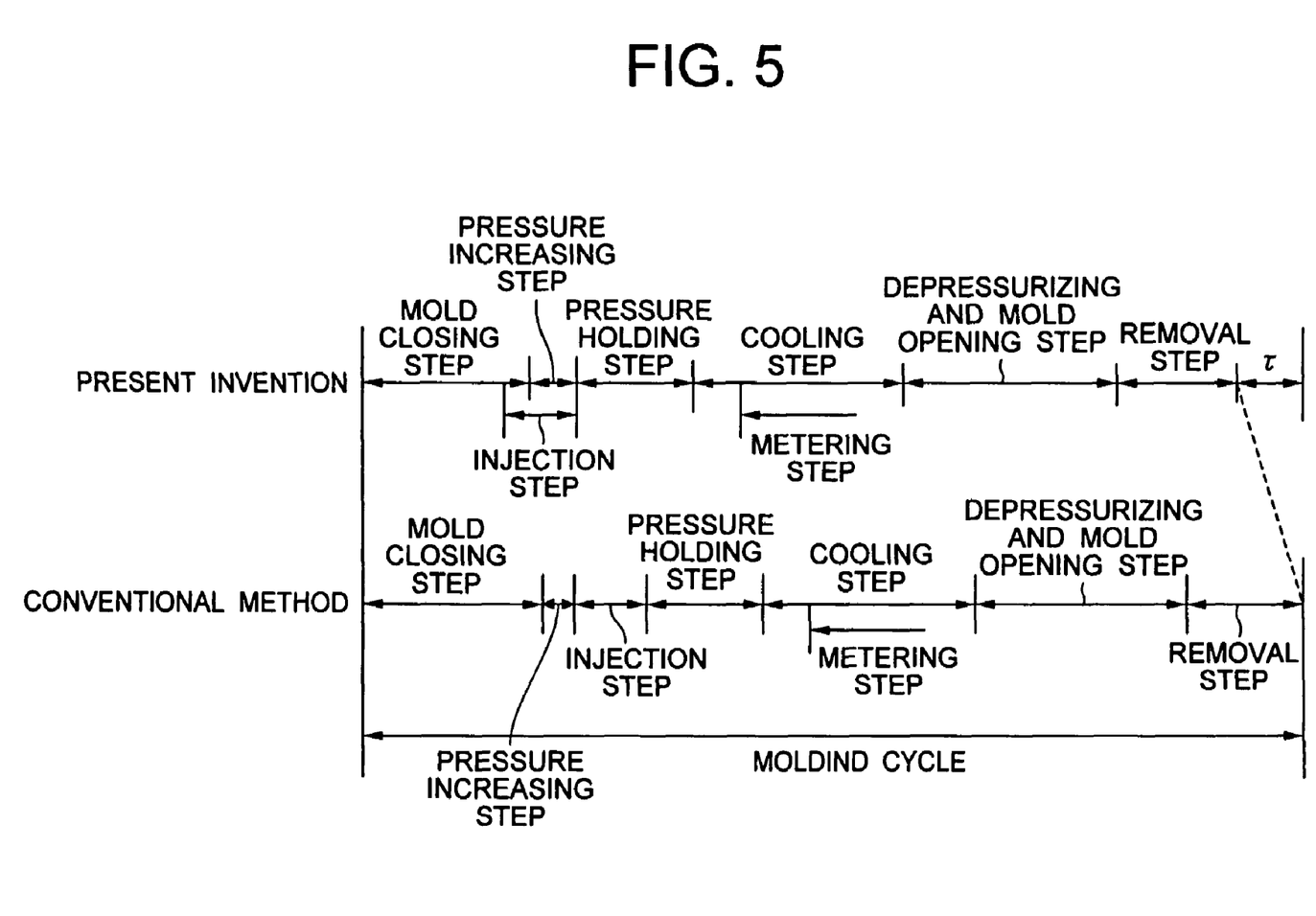
FIG. 5 is a diagram showing, for comparison, the steps of an injection molding method according to the first embodiment of the present invention and the steps of a conventional injection molding method.

FIG. 4 is a time chart showing operation of the injection molding machine according to the first embodiment of the present invention. FIG. 5 is a diagram showing, for comparison, the steps of an injection molding method according to the first embodiment of the present invention and the steps of a conventional injection molding method.

First, at timing t11, the mold closing processing means causes the mold clamping apparatus 30 (FIG. 2) to start a mold closing step to thereby move the movable platen 23 from a retreat limit position Sa, representing a mold opening limit position, toward an advancement limit position Sd, representing a mold closing limit position of the movable mold 24.

During performance of the mold closing step, unillustrated movable-platen-position determination processing means of the control section 46 performs movable-platen-position determination processing so as to determine whether or not the movable platen 23 has reached an injection start position Sb, which is previously set between the retreat limit position Sa and the advancement limit position Sd. Subsequently, when the movable platen 23 reaches the injection start position Sb at a predetermined timing t12, the above-mentioned injection processing means causes the injection apparatus 31 to start an injection step so as to advance the screw to thereby inject the resin in accordance with a predetermined injection pressure pattern Pa. Notably, at the injection start position Sb, the movable mold 24 is not in contact with the stationary mold 14.

Next, when the pressure of the resin charged into the cavity becomes higher than a predetermined level at timing t13 during a period in which the movable platen 23 moves between the injection start position Sb and the advancement limit position Sd, the mold closing processing is completed, and a pressure increasing step is started, whereby the mold clamping force increases. Notably, when the resin pressure becomes higher than the predetermined level, the mold clamping force naturally increases, so that the completion of the mold closing processing and the start of the pressure increasing step occur automatically. Subsequently, the mold clamping force further increases as result of engagement of the movable mold 24 with the stationary mold 14. Notably, the position where the pressure increasing step is started will be referred to as a "pressure-increase start position Sc."

When the mold clamping force increases in the pressure increasing step, unillustrated tie bars of the mold clamping apparatus 30 extend, and the movable platen 23 is advanced further by an amount corresponding to the extension. When the movable platen 23 reaches the advancement limit position Sd at time timing t14 and the pressure increasing step is completed, the above-mentioned mold clamping processing means starts the mold clamping step. Meanwhile, the injection processing means causes the injection apparatus 31 to complete the injection step.

Here, the movable platen 23 does not stop until the movable mold 24 comes into engagement with the stationary mold 14, and the mold closing operation is performed through utilization of the inertial force of the movable platen 23 during advance movement. Accordingly, movement of the movable platen 23, advancing at high speed, is not required to stop, and no energy is needed to brake the movable platen 23, so that consumed electrical power can be reduced.

When the injection step is completed, unillustrated pressure holding processing means of the control section 46 performs pressure holding processing so as to cause the injection apparatus 31 to start a pressure holding step, whereby the resin pressure in the cavity is maintained in accordance with a predetermined holding pressure pattern Pb. At this time, the above-mentioned mold clamping processing means causes the mold clamping apparatus 30 to perform a first mold clamping operation with a first mold clamping force P1 and then perform a second mold clamping operation with a second mold clamping force P2 (P2<P1).

In the present embodiment, at timing t14, the first mold clamping operation is started upon completion of the injection step. However, the injection step may be completed at a proper timing between start of the first mold clamping operation and completion of the mold clamping step.

Subsequently, at time t15, the pressure holding processing means causes the injection apparatus 31 to end the pressure holding step, and unillustrated cooling processing means of the control section 46 performs cooling processing so as to start a cooling step, to thereby cool the stationary mold 14 and the movable mold 24 to a predetermined temperature. Subsequently, the above-mentioned mold clamping processing means causes the mold clamping apparatus 30 to perform a third mold clamping operation with a third mold clamping force P3 (P3<P2) after performance of the second mold clamping operation.

At timing t16, the above-mentioned cooling processing means causes the injection apparatus 31 to complete the cooling step, and the above-mentioned mold clamping processing means causes the mold clamping apparatus 30 to complete the mold clamping step.

After that, the above-mentioned mold opening processing means performs mold opening processing so as to cause the mold clamping apparatus 30 to start a depressurizing and mold opening step, to thereby retreat the movable platen 23 from the advancement limit position Sd to the retreat limit position Sa. Subsequently, at time timing t17, the above-mentioned mold opening processing means completes the depressurizing and mold opening step to thereby stop the movable platen 23. Subsequently, unillustrated removal processing means of the control section 46 performs removal processing so as to start a removal step. As a result, an unillustrated removing machine is operated so as to remove the disc substrate from the mirror surface plate 28. Subsequently, at timing t18, the removal processing means completes the removal step so as to end the injection molding.

Notably, the injection start position Sb and the advancement limit position Sd are set through operation of the operation section 48 (see FIG. 3) such that the injection start position Sb is located rearward of the advancement limit position Sd.

As described above, the injection step is started before the movable platen 23 reaches the advancement limit position Sd; i.e., before completion of the mold closing step, and before start of the pressure increasing step. Therefore, as shown in FIG. 5, the molding cycle can be shortened by an amount corresponding to a time by which the start of the injection step is advanced; i.e., time τ.

Moreover, the temperatures of the stationary mold 14, the movable mold 24, the heating cylinder 32, etc. are not required to be lowered, and the molding temperature can be increased sufficiently. Therefore, it becomes possible to prevent deterioration of accuracy in transfer of a pattern of an information surface of the stamper. As a result, distortion, residual stress, and the like are not generated in a molded disc substrate, whereby the mechanical characteristics of the disc substrate are improved. In addition, since occurrence of birefringence or the like can be suppressed, the optical characteristics of the molded disc substrate can be improved.

Next, a second embodiment of the present invention will be described.

Figure 6:
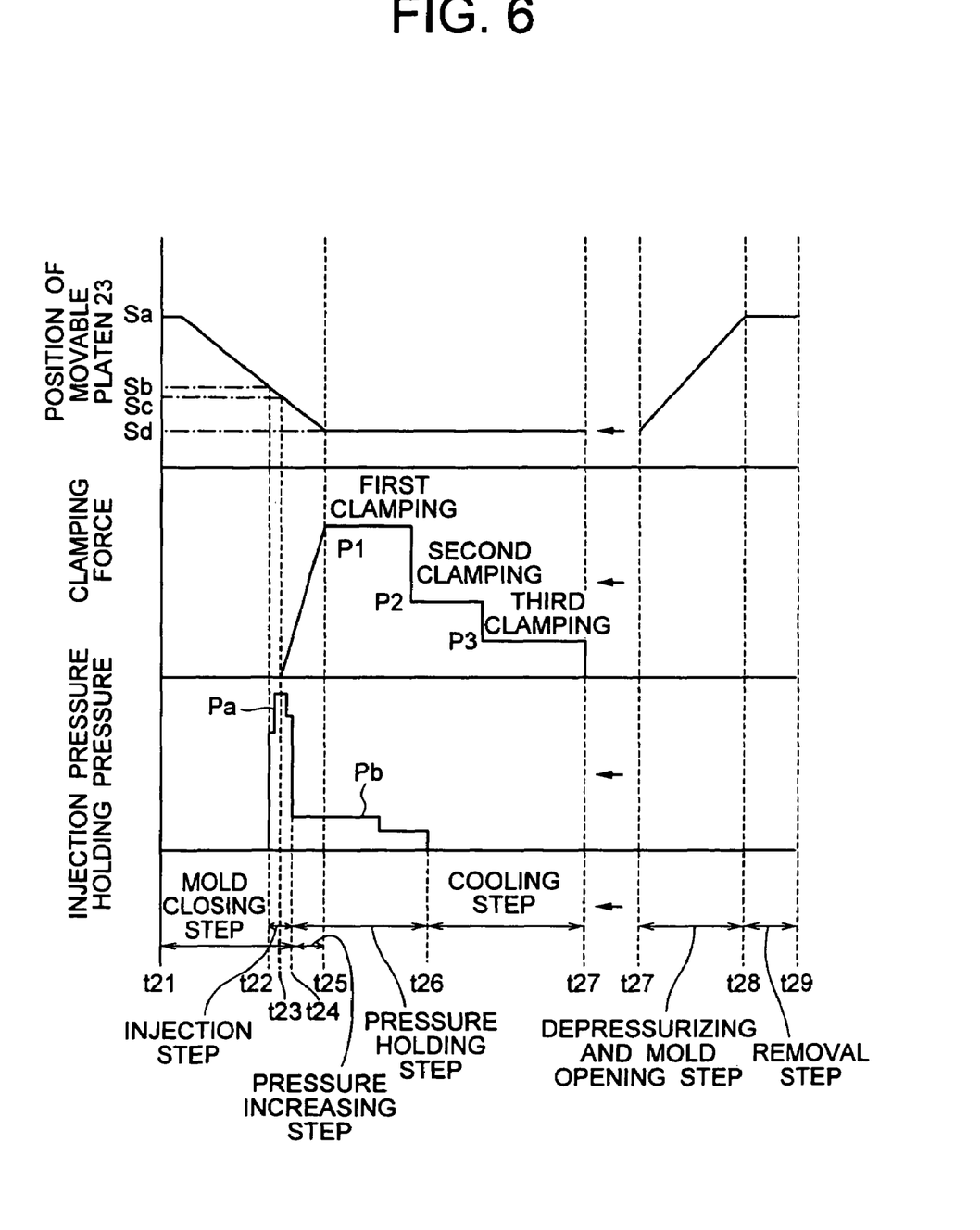
FIG. 6 is a time chart showing operation of an injection molding machine according to a second embodiment of the present invention.
Figure 7:
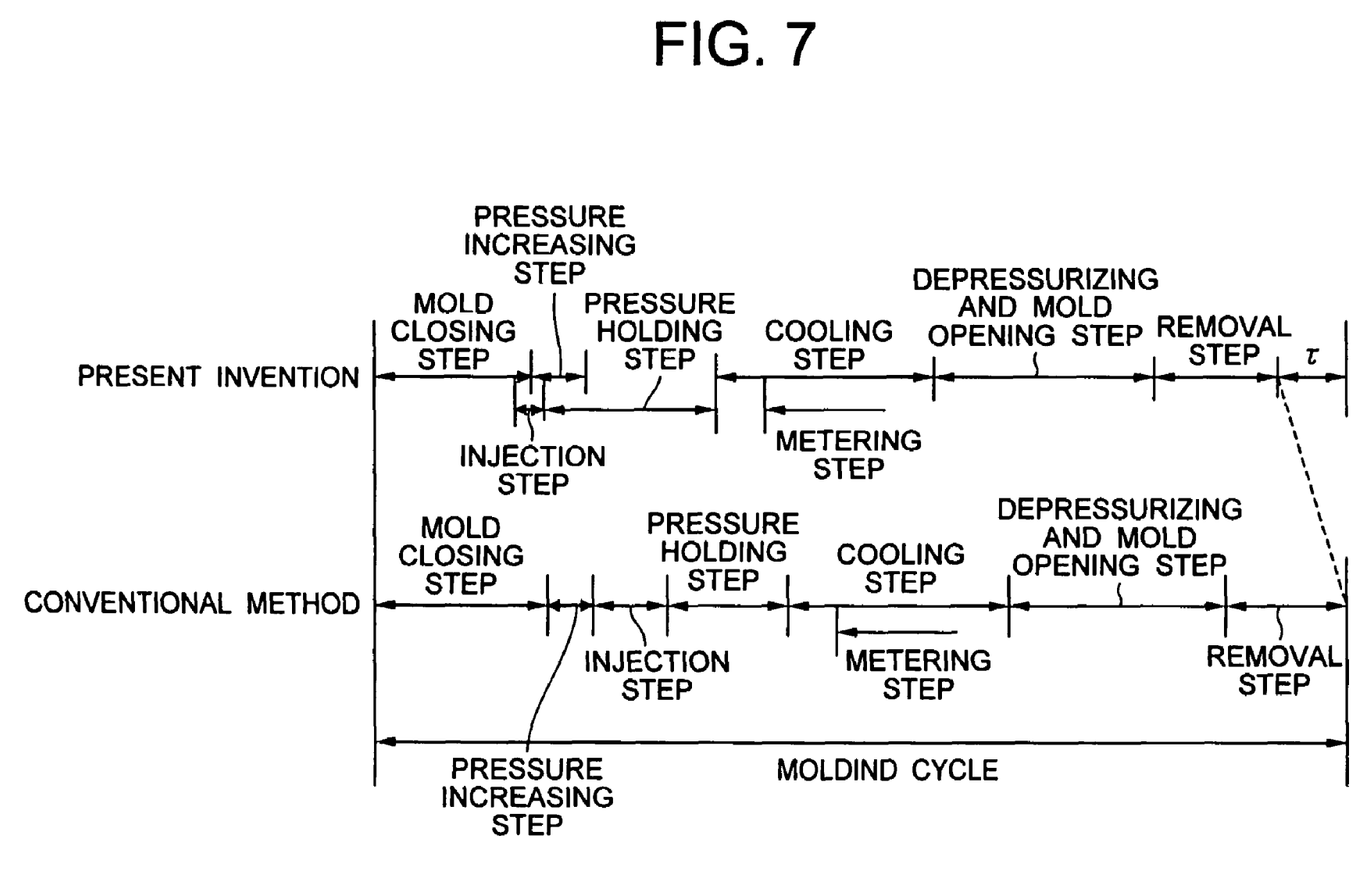
FIG. 7 is a diagram showing, for comparison, the steps of an injection molding method according to the second embodiment of the present invention and the steps of a conventional injection molding method.

FIG. 6 is a time chart showing operation of an injection molding machine according to the second embodiment of the present invention. FIG. 7 is a diagram showing, for comparison, the steps of an injection molding method according to the second embodiment of the present invention and the steps of a conventional injection molding method.

First, at timing t21, the mold closing processing means causes the mold clamping apparatus 30 (FIG. 2) to start a mold closing step to thereby move the movable platen (second support member) 23 from a retreat limit position Sa, representing a mold opening limit position, toward an advancement limit position Sd, representing a mold closing limit position.

During performance of the mold closing step, the above-mentioned movable-platen-position determination processing means determines whether or not the movable platen 23 has reached an injection start position Sb. Subsequently, when the movable platen 23 reaches the injection start position Sb at a predetermined timing t22, the above-mentioned injection processing means causes the injection apparatus 31 to start an injection step so as to advance the screw to thereby inject the resin in accordance with a predetermined injection pressure pattern Pa. Notably, at the injection start position Sb, the movable mold (second mold) 24 is not in contact with the stationary mold (first mold) 14.

Next, when the pressure of the resin charged into the cavity becomes higher than a predetermined level at timing t23 during a period in which the movable platen 23 moves between the injection start position Sb and the advancement limit position Sd, the mold closing processing is completed, and a pressure increasing step is started, whereby the mold clamping force increases. Notably, when the resin pressure becomes higher than the predetermined level, the mold clamping force naturally increases, so that the completion of the mold closing processing and the start of the pressure increasing step occur automatically. Subsequently, the mold clamping force further increases as result of engagement of the movable mold 24 with the stationary mold 14. Notably, the position where the pressure increasing step is started will be referred to as a "pressure-increase start position Sc."

When the mold clamping force increases in the pressure increasing step, the above-mentioned tie bars extend, and the movable platen 23 is advanced further by an amount corresponding to the extension.

Subsequently, at timing t24, the above-mentioned injection processing means cause the injection apparatus 31 to complete the injection step, and the above-mentioned pressure holding processing means starts a pressure holding step, whereby the resin pressure in the cavity is held in accordance with a predetermined holding pressure pattern Pb. In the present embodiment, the above-mentioned timing t24 is set to coincide with the timing at which the movable mold 24 comes into engagement with the stationary mold 14. However, the timing t24 may be set to be slightly before or after the timing at which the movable mold 24 comes into engagement with the stationary mold 14.

After that, the resin within the cavity is compressed while being sandwiched between the mirror surface plates 18 and 28 until the movable platen 23 moved by the mold clamping apparatus 30 reaches the advancement limit position Sd at timing t25.

When the movable platen 23 reaches the advancement limit position Sd at timing t25, the pressure increasing step is completed, and the above-mentioned mold clamping processing means starts a mold clamping step so as to perform a first mold clamping operation with a first mold clamping force P1 and then perform a second mold clamping operation with a second mold clamping force P2.

Subsequently, at timing t26, the pressure holding processing means completes the pressure increasing step in the injection apparatus 31, and the cooling processing means performs cooling processing so as to start a cooling step, to thereby cool the stationary mold 14 and the movable mold 24 to a predetermined temperature. Subsequently, the above-mentioned mold clamping processing means causes the mold clamping apparatus 30 to perform a third mold clamping operation with a third mold clamping force P3 after performance of the second mold clamping operation.

At timing t27, the above-mentioned cooling processing means completes the cooling step in the injection apparatus 31, and the above-mentioned mold clamping processing means completes the mold clamping step in the mold clamping apparatus 30.

After that, the above-mentioned mold opening processing means performs mold opening processing so as to cause the mold clamping apparatus 30 to start a depressurizing and mold opening step, to thereby retreat the movable platen 23 from the advancement limit position Sd to the retreat limit position Sa. Subsequently, at time timing t28, the above-mentioned mold opening processing means completes the depressurizing and mold opening step to thereby stop the movable platen 23. Subsequently, the above-mentioned removal processing means starts removal processing so as to start a removal step. As a result, the above-mentioned removing machine is operated so as to remove the disc substrate from the mirror surface plate 28 as a molded product. Subsequently, at timing t29, the removal processing means completes the removal step so as to end the injection molding.

As described above, the injection step is started before the movable platen 23 reaches the advancement limit position Sd; i.e., before completion of the mold closing step, and before start of the pressure increasing step. Therefore, as shown in FIG. 7, the molding cycle can be shortened by an amount corresponding to a time by which the start of the injection step is advanced; i.e., time τ.

Moreover, since the injection step is completed before completion of the pressure increasing step, the resin charged into the cavity reaches the circumferential edge of the cavity while maintaining its high temperature. Accordingly, the accuracy in transfer of the pattern of the information surface of the stamper can be further improved.

The present invention is not limited to the above-described embodiment. Numerous modifications and variations of the present invention are possible in light of the spirit of the present invention, and they are not excluded from the scope of the present invention.

INDUSTRIAL APPLICABILITY

The present invention can be applied to injection molding machines for molding disc substrates.

The invention claimed is:
1. An injection molding machine comprising:
(a) a mold closing processing section which advances without stopping a movable platen until a movable mold comes into contact with a stationary mold so as to perform mold closing;

(b) a movable-platen-position determination section which determines whether or not the movable platen has reached an injection start position set between a mold opening limit position and a mold closing limit position; and (c) an injection processing section which starts an injection step with advancing the movable platen when the movable platen reaches the injection start position.

2. An injection molding machine according to claim 1, wherein a pressure increasing step is started with start of the injection step.

3. An injection molding machine according to claim 1, wherein the injection processing section starts the injection step before completion of a mold closing step.

4. An injection molding machine according to claim 1, wherein the injection processing section ends the injection step before completion of a pressure increasing step.

5. An injection molding method comprising the steps of:
(a) advancing without stopping a movable platen until a movable mold comes into contact with a stationary mold so as to perform mold closing;
(b) determining whether or not the movable platen has reached an injection start position set between a mold opening limit position and a mold closing limit position; and
(c) starting an injection step with advancing the movable platen when the movable platen reaches the injection start position.

* * * * *